(12) United States Patent
Chen (10) Patent No.: US 7,451,863 B2
(45) Date of Patent: Nov. 18, 2008

(54) HUB DRIVING ASSEMBLY FOR TRANSMITTING A DRIVING FORCE FROM A SPROCKET TO ROTATE A HUB OF A BICYCLE

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 325 days.

(21) Appl. No.: 11/361,983

(22) Filed: Feb. 27, 2006

(65) Prior Publication Data

US 2007/0199788 A1   Aug. 30, 2007

(51) Int. Cl.
*F16D 41/30* (2006.01)
(52) U.S. Cl. .......................... 192/64; 192/46
(58) Field of Classification Search ................ 192/46, 192/64
See application file for complete search history.

(56) References Cited

U.S. PATENT DOCUMENTS

| | | | | |
|---|---|---|---|---|
| 842,587 A | * | 1/1907 | Skogstad et al. ............. | 192/46 |
| 1,832,805 A | * | 11/1931 | Brewster ..................... | 192/46 |
| 5,547,055 A | * | 8/1996 | Chang et al. ................. | 192/64 |
| 5,553,510 A | * | 9/1996 | Balhorn ....................... | 192/64 |
| 2003/0094850 A1 | * | 5/2003 | Chen ......................... | 301/110.5 |
| 2003/0198419 A1 | * | 10/2003 | Chen ......................... | 384/545 |
| 2006/0021836 A1 | * | 2/2006 | Kimes et al. ................. | 192/46 |

* cited by examiner

*Primary Examiner*—Rodney H Bonck
(74) *Attorney, Agent, or Firm*—Stephen A. Bent; Foley & Lardner LLP (57) ABSTRACT

A hub driving assembly is adapted to uni-directionally transmit a driving force of a sprocket to rotate a hub, and includes a sprocket-mounting cylinder having retreat bores which respectively extend from a tubular end surface through an outer cylindrical surface, and positioning holes which extend axially from the tubular end surface. A plurality of pawls are disposed in the retreat bores, and are biased by biasing members in the retreat bores to be movable between a driving position, where the pawls extend radially and outwardly for engaging the hub, and an idle position, where the pawls retreat into the retreat bores. A barrier member includes a ring abutment and a plurality of inserts fitted into the positioning holes to bring the ring abutment into abutment against the tubular end surface so as to prevent removal of the pawls and the biasing members from the bores.

6 Claims, 9 Drawing Sheets

HUB DRIVING ASSEMBLY FOR TRANSMITTING A DRIVING FORCE FROM A SPROCKET TO ROTATE A HUB OF A BICYCLE

BACKGROUND OF THE INVENTION

1. Field of the Invention

This invention relates to a hub driving assembly for a hub of a bicycle, more particularly to a hub driving assembly which is adapted to be connected to a sprocket of a bicycle to transmit a driving force from the sprocket to rotate a hub.

2. Description of the Related Art

Figure 1:
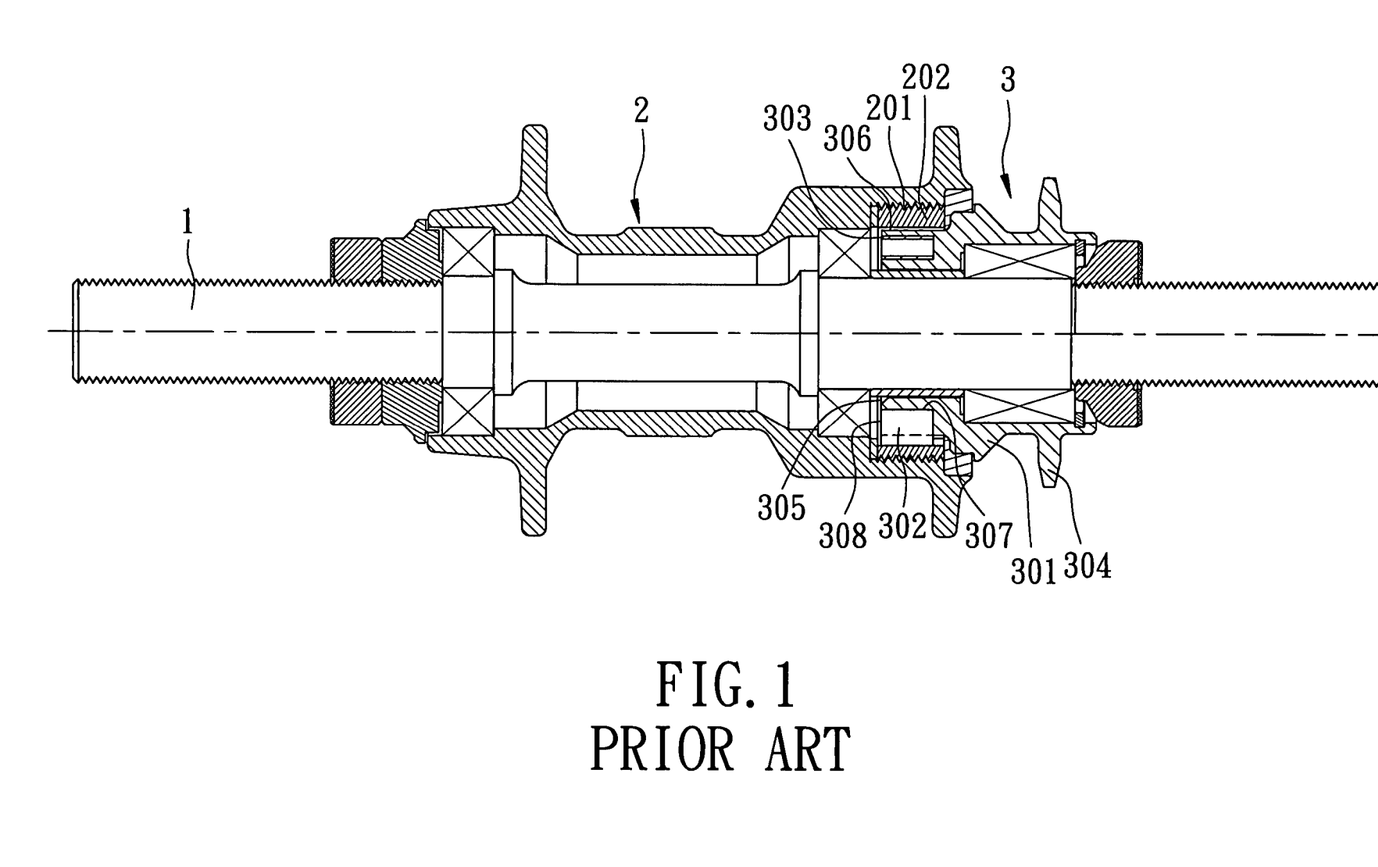
FIG. 1 is a sectional view of a conventional bicycle hub assembly.
Figure 2:
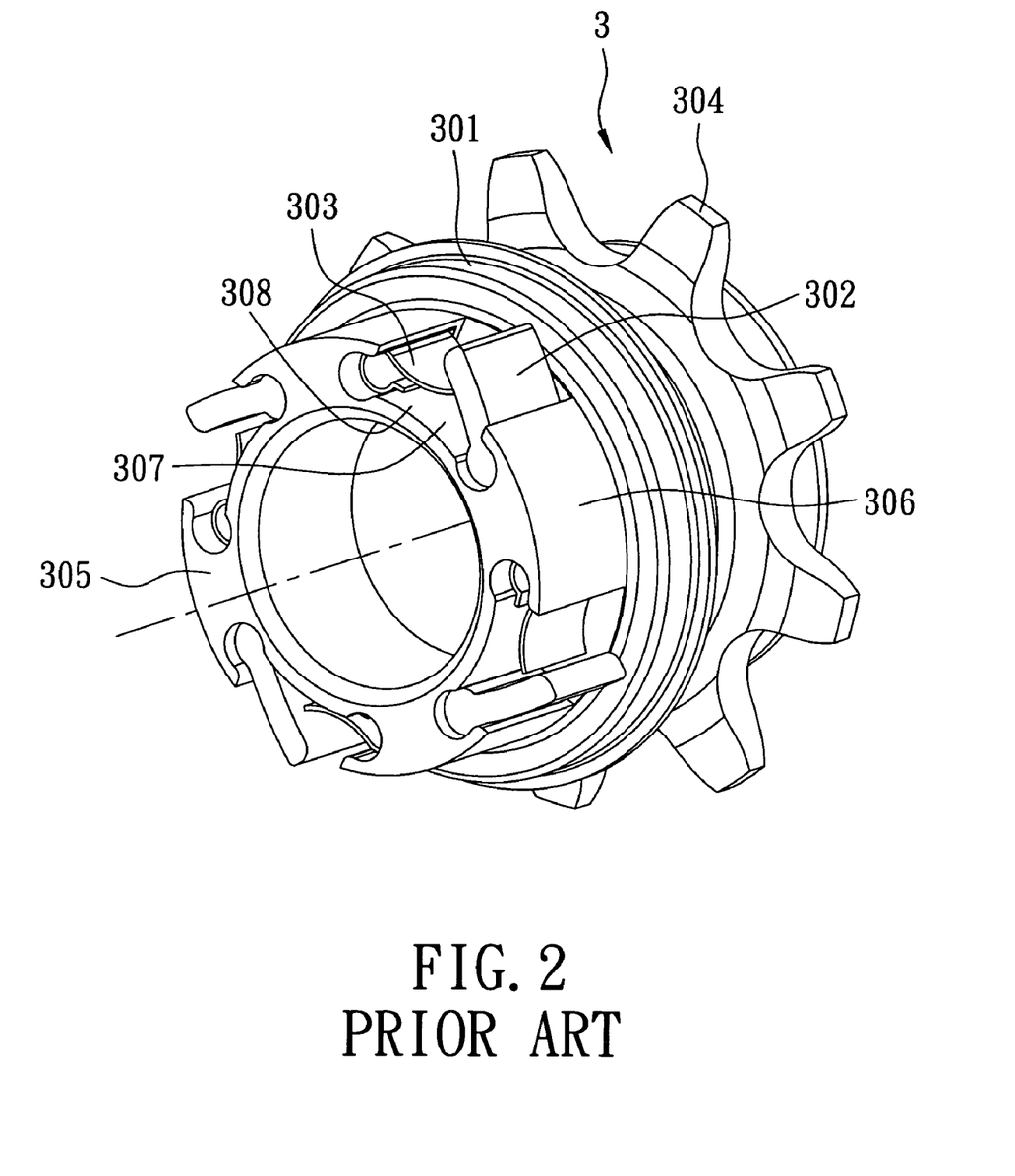
FIG. 2 is a perspective view of a driving unit of the conventional bicycle hub assembly.
Figure 3:
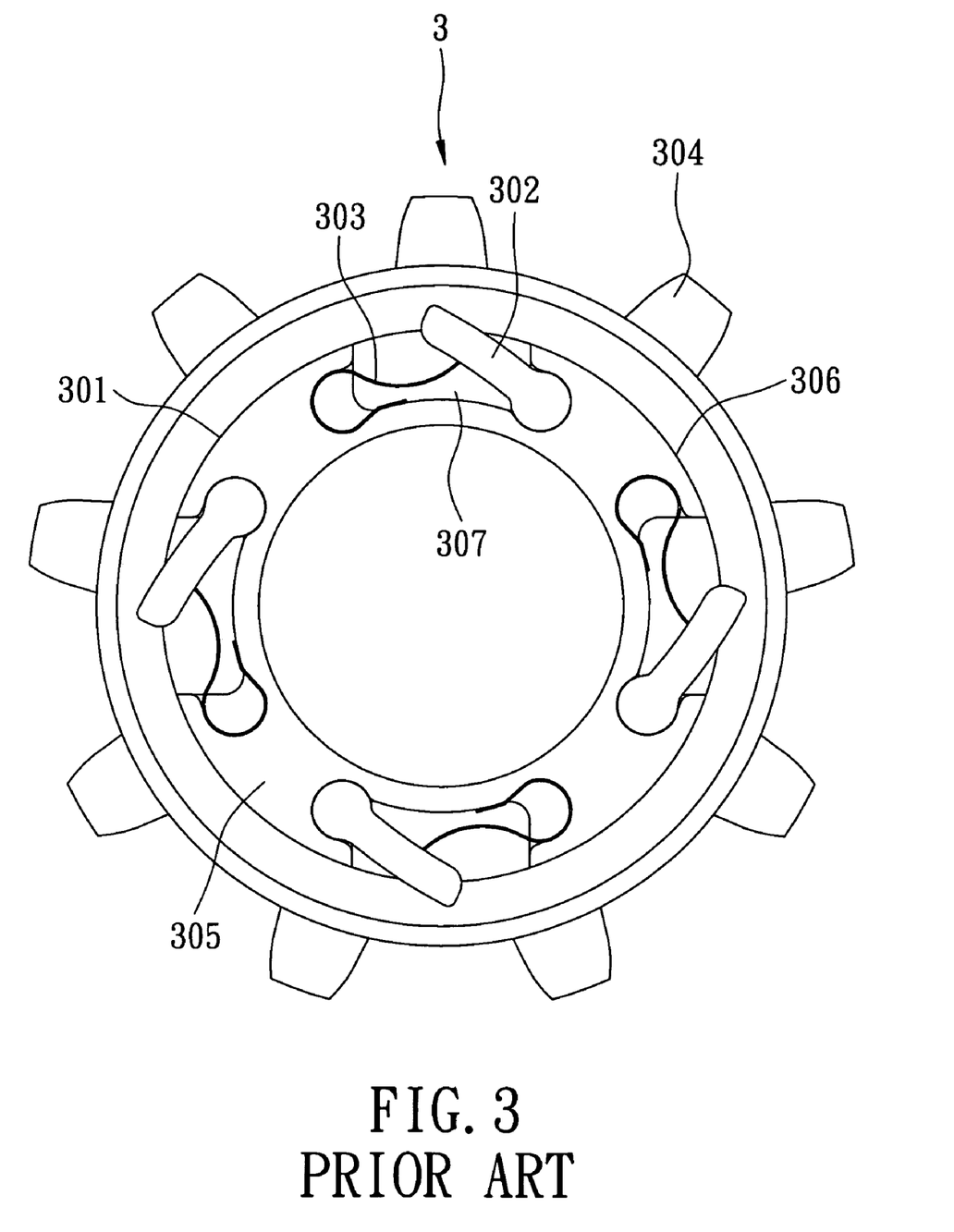
FIG. 3 is an end view of the driving unit of FIG. 2.

Referring to FIG. 1, a conventional bicycle hub assembly is shown to include a hub 2 mounted on and rotatable relative to an axle 1, and a driving unit 3 disposed to uni-directionally transmit a driving force to rotate the hub 2. The hub 2 has an inner tubular wall 201 and a toothed member 202 disposed in the inner tubular wall 201. The driving unit 3 is mounted on and is rotatable relative to the axle 1. Referring to FIGS. 2 and 3, the driving unit 3 includes a sprocket-mounting cylinder 301, a plurality of pawls 302, and a plurality of biasing members 303. The cylinder 301 has an outer cylindrical surface 306 which extends along an axis of the axle 1 to terminate at a tubular end surface 305, and a plurality of angularly-displaced retreat bores 307 which extend respectively and axially from the tubular end surface 305. The cylinder 301 is formed integrally with a sprocket 304 for receiving a driving force therefrom. The pawls 302 and the biasing members 303 are disposed respectively in the retreat bores 307. Each of the pawls 302 is movable by the biasing action of the respective biasing member 303 to a driving position, where the pawl 302 extends radially and outwardly for meshing with the toothed member 202 (as shown in FIG. 1) such that the driving force is transmitted to rotate the hub 2 when the sprocket is rotated in a driving direction (i.e. a counterclockwise direction as shown in FIG. 3).

Although the driving unit 3 can transmit the uni-directional driving force to the hub 2, the following drawbacks arise:

1. The pawls 302 and the biasing members 303 may be moved axially and may thus slip from the retreat bores 307 through access openings 308 in the tubular end surface 305 before the driving unit 3 is fitted in the hub 2, thereby resulting in inconvenience during assembly.

2. Even after the assembly of the driving unit 3 to the hub 2 is completed, the pawls 302 may move freely in the retreat bores 307 and are partially exposed to the access openings 308, thereby resulting in reduced driving force.

3. As the pawls 302 and the biasing members 303 may move freely in the retreat bores 307, the service life thereof is shortened.

SUMMARY OF THE INVENTION

The object of the present invention is to provide a hub driving assembly which can be assembled to a bicycle hub conveniently, which can rotate the hub with a constant driving force, and which has pawls durable.

According to this invention, the hub driving assembly includes a sprocket-mounting cylinder having a tubular mount which is adapted to be fitted in a hub by virtue of displacement of the tubular mount along an axis of an axle in an axial direction to an operating position, and which is rotatable about the axis relative to the axle. The tubular mount has an outer cylindrical surface which surrounds the axis and which extends along the axis to terminate at a tubular end surface, and a plurality of retreat bores which are angularly displaced from one another about the axis. Each of the retreat bores extends in the axial direction from the tubular end surface, and in a radial direction relative to the axis to define an opening that extends through the outer cylindrical surface. The tubular mount further has a plurality of positioning holes which are angularly displaced from one another about the axis and which respectively extend in the axial direction from the tubular end surface. A plurality of pawls are disposed respectively in the retreat bores such that in the operating position, the pawls are movable between a driving position, where the pawls extend radially and outwardly of the outer cylindrical surface for engaging a toothed member of the hub, and an idle position, where the pawls retreat radially and inwardly of the outer cylindrical surface so as to permit free-wheeling of the hub. A plurality of biasing members are mounted respectively in the retreat bores, and are disposed to respectively bias the pawls to the driving position. A barrier member includes a ring abutment which surrounds the axis and which confronts the tubular end surface, and a plurality of inserts which respectively extend in the axial direction from the ring abutment and which are angularly displaced from one another about the axis. Each of the inserts is configured to be fitted into a respective one of the positioning holes to bring the ring abutment into abutment against the tubular end surface so as to prevent removal of the pawls and the biasing members from the retreat bores.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 4:
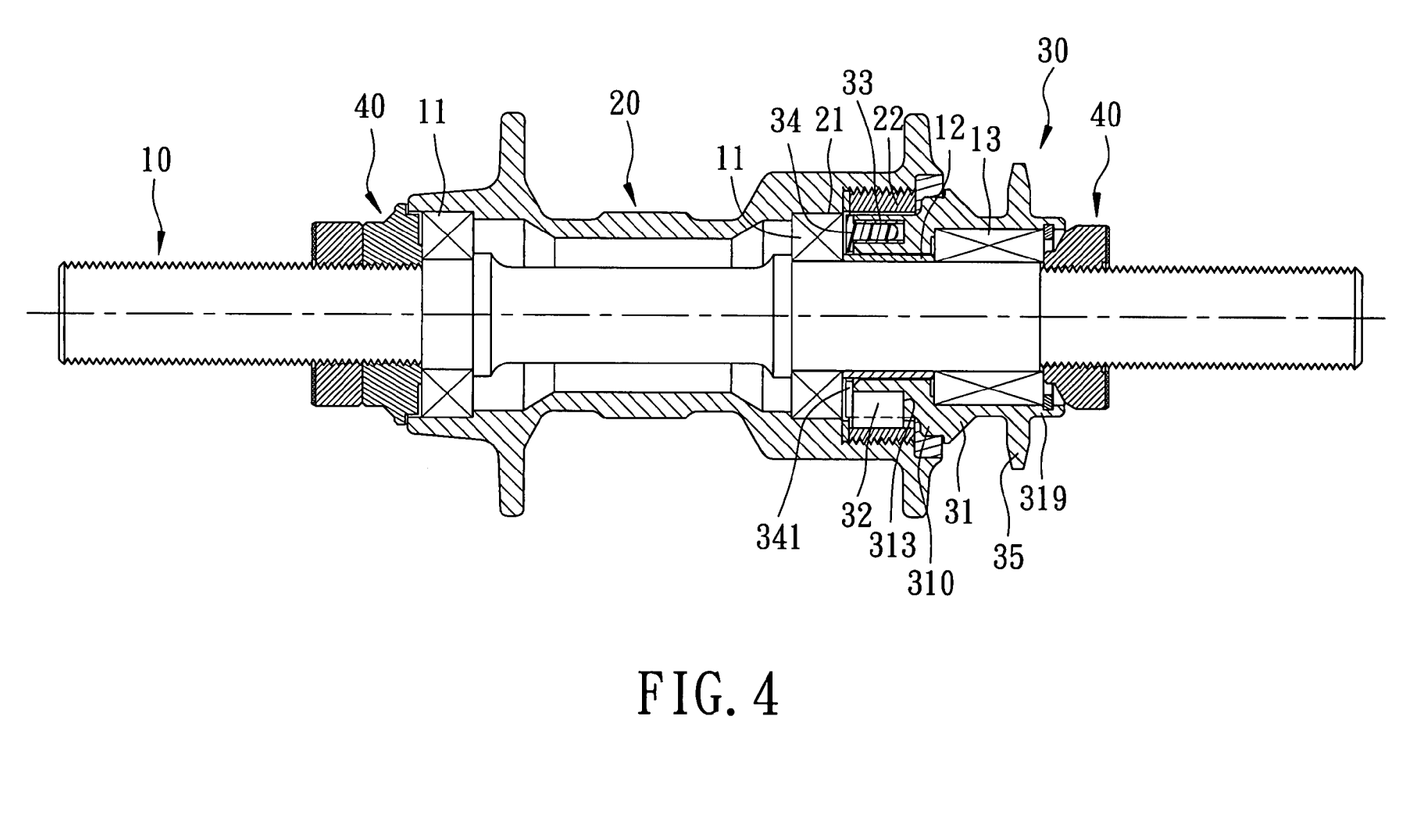
FIG. 4 is a sectional view of the first preferred embodiment of a hub driving assembly according to this invention when assembled to a bicycle hub.

Referring to FIG. 4, the preferred embodiment of a hub driving assembly 30 according to the present invention is shown to comprise a sprocket-mounting cylinder 31, a plurality of pawls 32, a plurality of biasing members 33, and a barrier member 34. The hub driving assembly 30 is adapted to be disposed to transmit a driving force from a bicycle sprocket to rotate a hub 20. The hub 20 is mounted on an axle 10 in an axial direction by means of two ball bearings 11 so as to be rotatable about an axis of the axle 10, and has an inner tubular wall 21 which extends along the axis, and a toothed member 22 which is disposed in the inner tubular wall 21.

Figure 5:
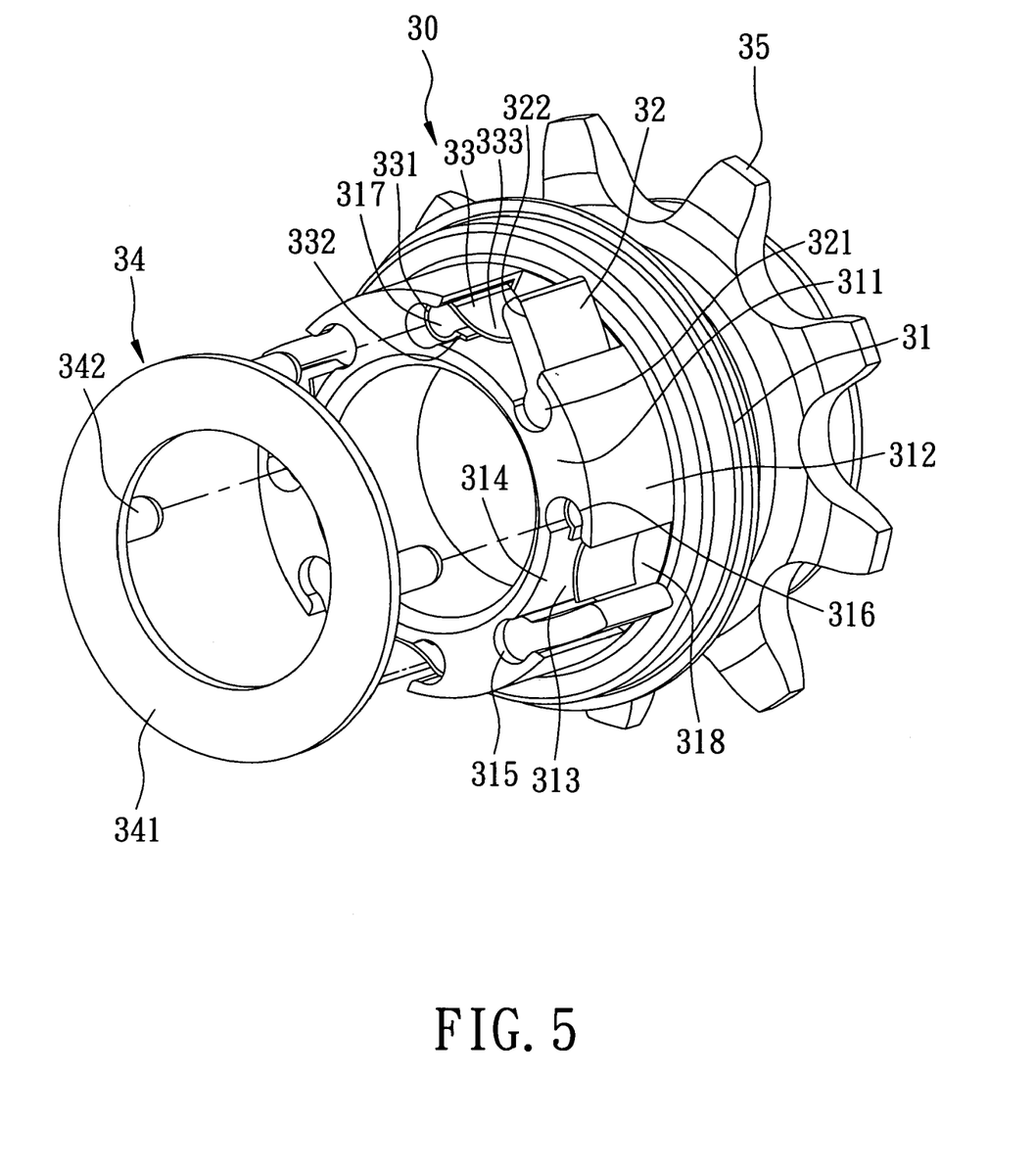
FIG. 5 is an exploded perspective view of the first preferred embodiment.
Figure 6:
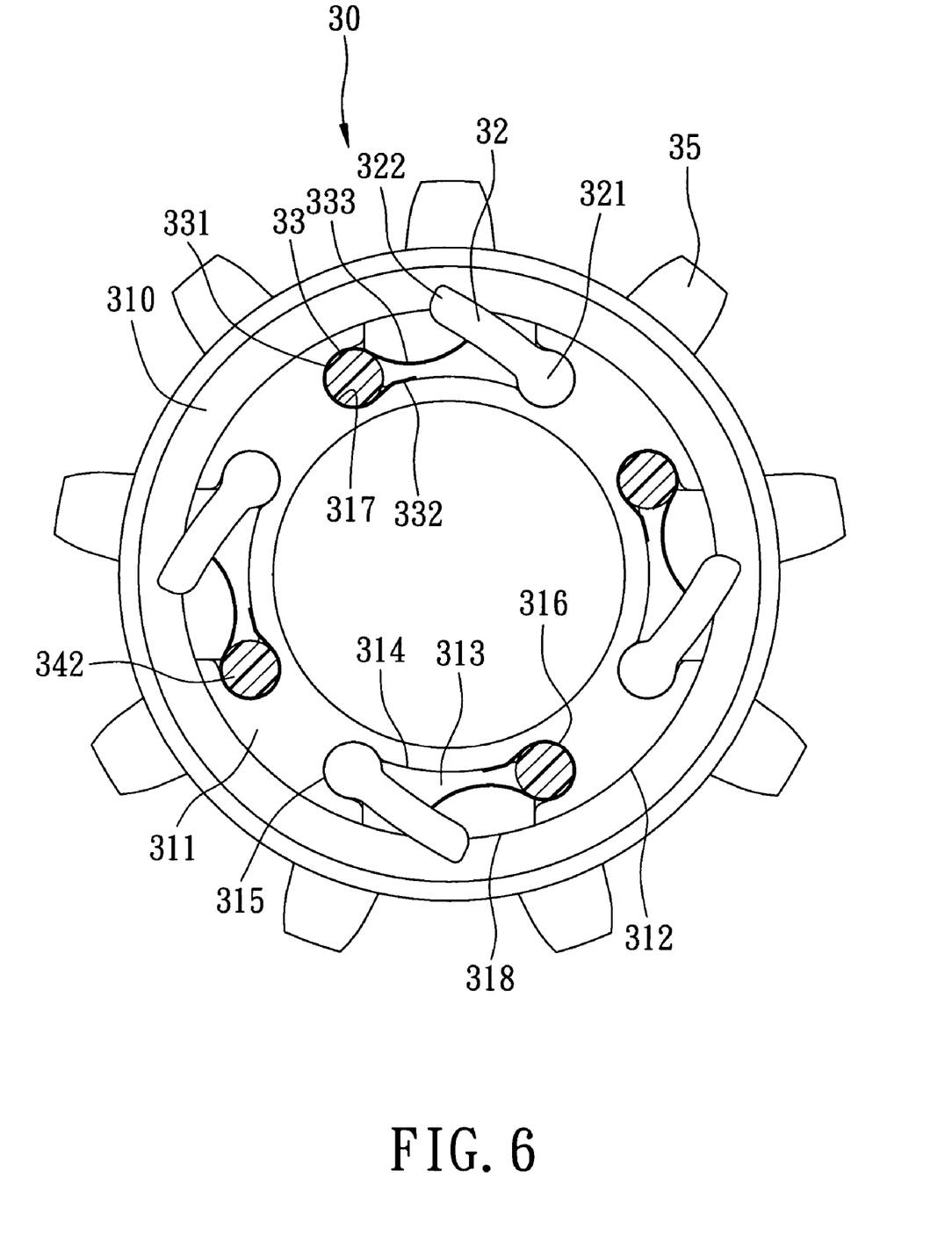
FIG. 6 is a partially-sectioned end view of the hub driving assembly of FIG. 5.

With reference to FIGS. 4 to 6, the sprocket-mounting cylinder 31 is mounted on the axle 10 by means of a self-lubricating bearing 12 and a needle bearing 13 so as to be rotatable about the axis relative to the axle 10. Thus, the hub 20 and the hub driving assembly 30 are positioned on the axle 10 in the axial direction by means of two tubular sleeves 40.

The cylinder 31 includes a tubular mount 310 and a sprocket-mounting member 319 which is integrally formed with and which extends from the tubular mount 310 along the axis. The tubular mount 310 is adapted to be fitted in the inner tubular wall 21 of the hub 20 by virtue of displacement of the tubular mount 310 to an operating position, and has an outer cylindrical surface 312 which surrounds the axis to confront the inner tubular wall 21 of the hub 20 in the operating position, and which extends along the axis to terminate at a tubular end surface 311, and a plurality of retreat bores 313 which are angularly displaced from one another about the axis. Each of the retreat bores 313 extends in the axial direction from the tubular end surface 311, and in a radial direction relative to the axis to define an opening 318 that extends through the outer cylindrical surface 312. Each of the retreat bores 313 has first and second retaining regions 315,316 opposite to each other in a driving direction (i.e. a counterclockwise direction as shown in FIG. 6) about the axis, and a middle region 314 interposed therebetween. In this embodiment, the sprocket-mounting member 319 is integrally formed with a sprocket 35 to receive a driving force therefrom, and is configured to be mounted laterally and outwardly of the hub 20 in the axial direction when the tubular mount 310 is in the operating position.

Each of the pawls 32 is disposed in a respective one of the retreat bores 313, and includes a pivotable end 321 which is inserted into the first retaining region 315 and which is pivotable about a pivot axis oriented in the axial direction, and a coupling end 322 which is opposite to the pivotable end 321 such that in the operating position, by means of pivotal movement of the pivotable end 321, the coupling end 322 is movable between a driving position, where the coupling end 322 extends radially and outwardly of the outer cylindrical surface 312 for engaging the toothed member 22 so that the driving force from the sprocket 35 can be transmitted to rotate the hub 20, and an idle position, where the coupling end 322 retreats radially and inwardly of the outer cylindrical surface 312 so as to permit freewheeling of the hub 20.

The biasing members 33 are mounted respectively in the retreat bores 313, and are disposed to respectively bias the coupling ends 322 of the pawls 32 to the driving position. Thus, during the displacement of the tubular mount 310 to the operating position, the pawls 32 are forced to remain in the idle position against the biasing action of the biasing members 33 until the tubular mount 310 reaches of the operating position. In this embodiment, each of the biasing members 33 is made of a steel strip, and includes a bending portion 331 which is bent and which is retained in the second retaining region 316, and first and second end portions 332,333 which extend respectively from the bending portion 331 and which are spaced apart from each other in a radial direction relative to the axis so as to vest the second end portion 333 with an urging force for biasing the coupling end 322 of the respective pawl 32 to the driving position. The bending portion 331 of each biasing member 33 is disposed to define a positioning hole 317 in the second retaining region 316.

The barrier member 34 includes a ring abutment 341 which surrounds the axis and which confronts the tubular end surface 311, and a plurality of inserts 342 which respectively extend in the axial direction from the ring abutment 341 and which are angularly displaced from one another about the axis. Each of the inserts 342 is configured to be fitted into the respective positioning hole 317 to bring the ring abutment 341 into abutment against the tubular end surface 311 so as to prevent removal of the pawls 32 and the biasing members 33 from the retreat bores 313.

Accordingly, the hub driving assembly 30 of this invention has advantages as follows:

1. Before the hub driving assembly 30 is assembled to the axle 10 and the hub 20, detachment of the pawls 32 and the biasing members 33 from the tubular mount 310 can be prevented by means of the barrier member 34, thereby resulting in convenient assembling.

2. In use, the pawls 32 and the biasing members 33 cannot move in the axial direction by virtue of the arrangement of the barrier member 34, thereby maintaining steady transmission of torque to the hub 20.

3. As the pawls 32 and the biasing members 33 are retained in the retreat bores 313 in a steady manner, the service life thereof can be prolonged.

Figure 7:
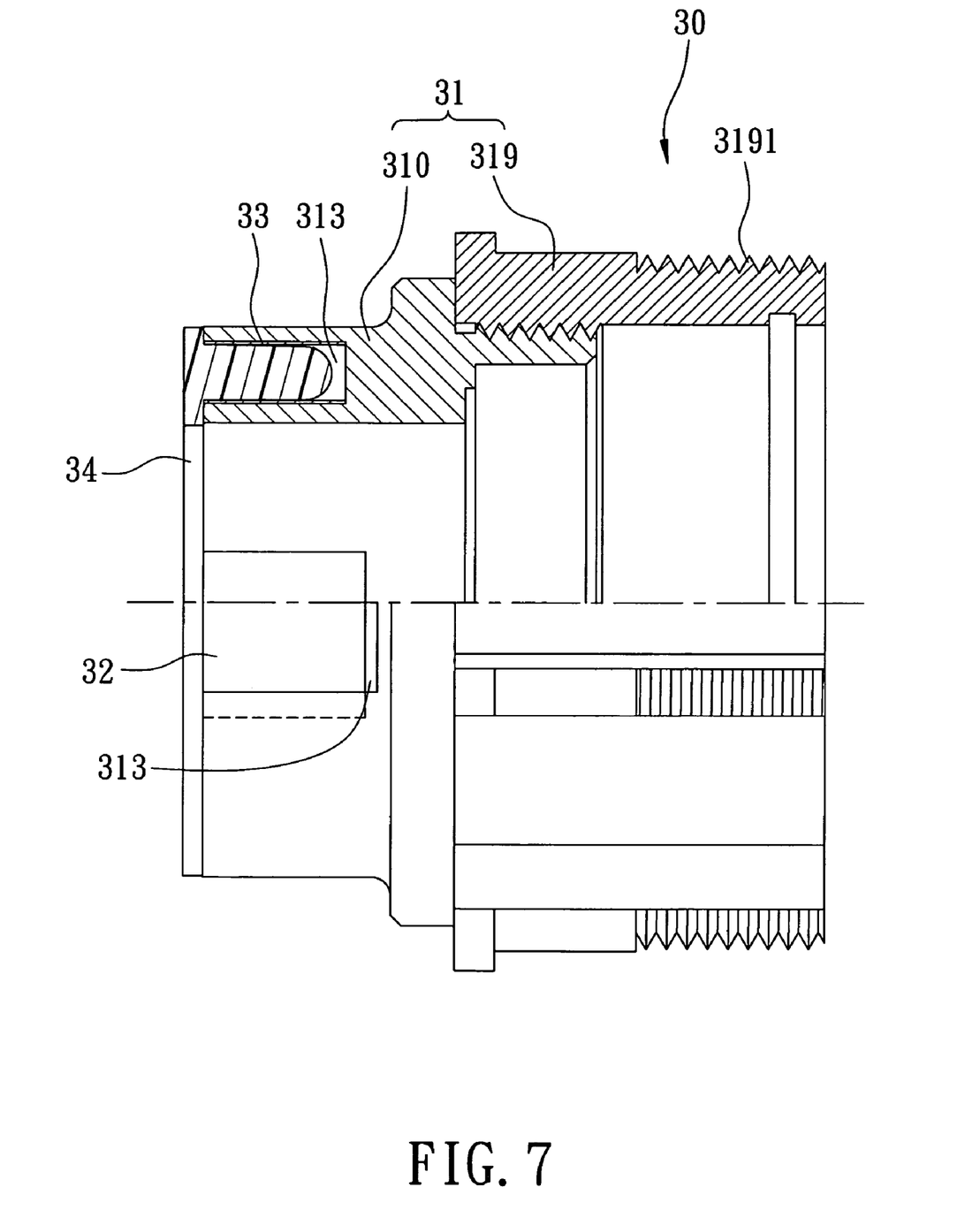
FIG. 7 is a partially sectioned schematic view of the second preferred embodiment of a hub driving assembly according to this invention.

Referring to FIG. 7, the second preferred embodiment of a hub driving assembly 30 according to this invention is shown to be similar to the aforesaid embodiment, except that the sprocket-mounting member 319 in the second embodiment is in threaded engagement with the tubular mount 310, and has an externally threaded portion 3191 extending around the axis to threadedly engage a sprocket (not shown).

Figure 8:
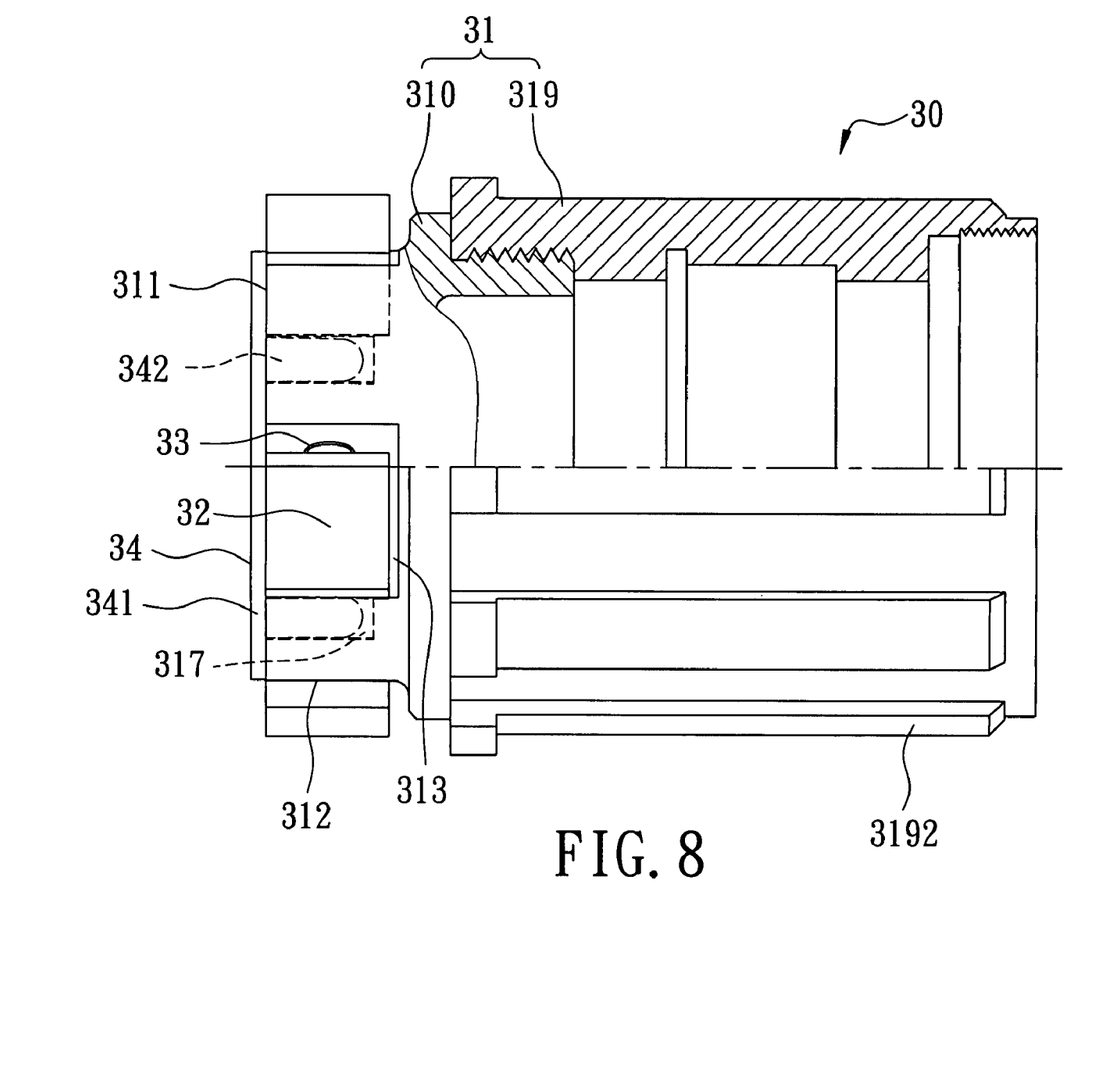
FIG. 8 is a partially sectioned schematic view of the third preferred embodiment of a hub driving assembly according to this invention.
Figure 9:
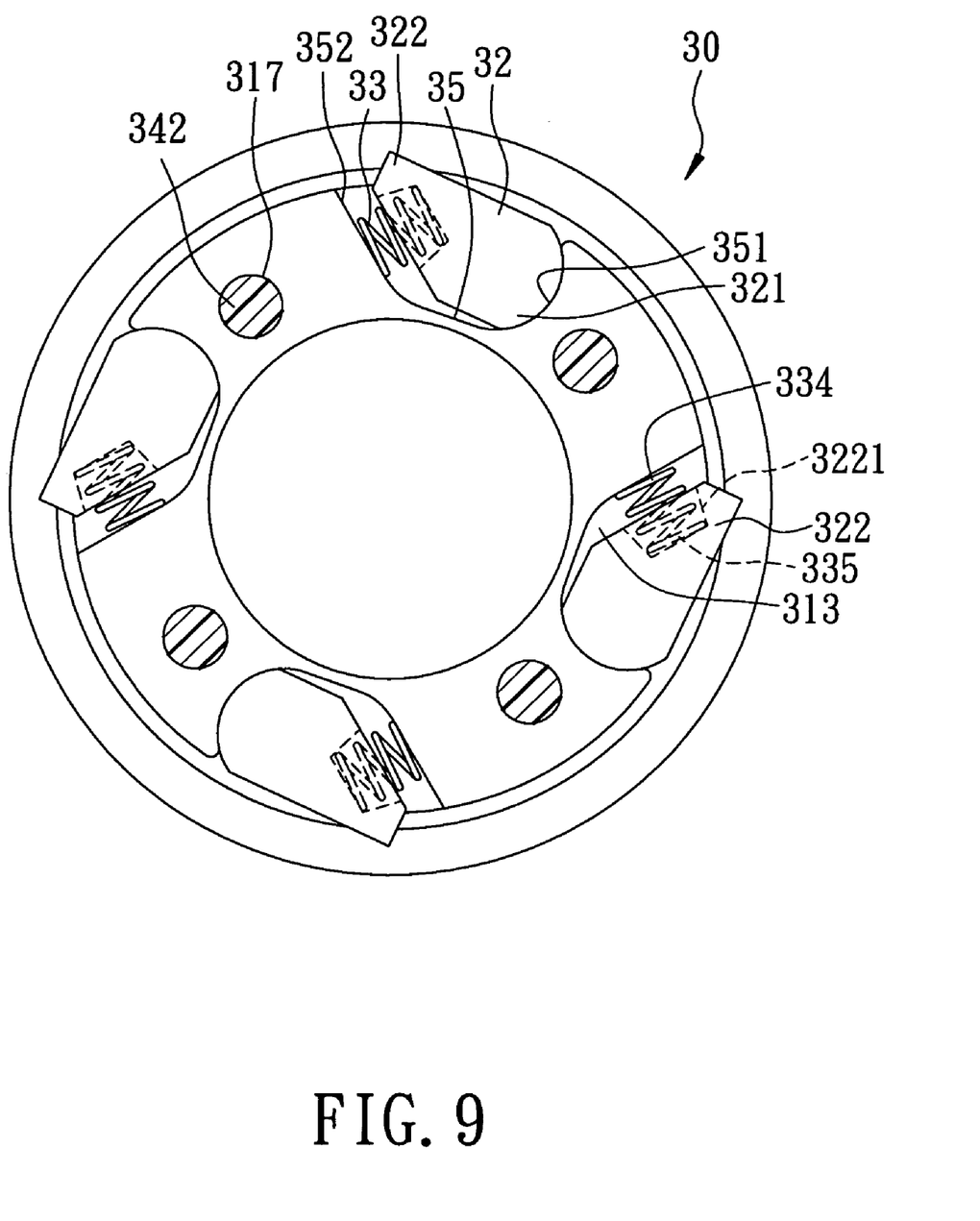
FIG. 9 is a partially-sectioned end view of the hub driving assembly of FIG. 8.

Referring to FIGS. 8 and 9, the third preferred embodiment of a hub driving assembly 30 according to this invention is shown to be similar to the second preferred embodiment, except that the sprocket-mounting member 319 in the third embodiment has a plurality of splines 3192 angularly displaced from one another about the axis to be in splined engagement with a plurality of sprockets (not shown). Further, the tubular mount 310 has a plurality of bore-confining surface portions 35 which are formed to connect the tubular end surface 311 and the outer cylindrical surface 312 so as to confine the retreat bores 313, respectively. Each of the bore-confining surface portions 35 has first and second regions 351,352 opposite to each other in a driving direction (i.e. a counterclockwise direction as shown in FIG. 9) about the axis. Each of the pawls 32 includes a pivotable end 321 which is pivotably connected to the first region 351 in the axial direction, and a coupling end 322 which is opposite to the pivotable end 321 and which is movable between the driving and idle positions by means of pivotal movement of the pivotable end 321. The coupling end 322 has a recess 3221 confronting the second retaining region 322. Furthermore, each of the biasing members 33 is a coil spring, such as a compression spring, which has a first end 334 that is connected to the second region 352, and a second end 335 that is received in the recess 3221 to engage the coupling end 322 so as to bias the coupling end 322 to the driving position. Moreover, the positioning holes 317 are angularly spaced apart from and are arranged alternately relative to the retreat bores 313.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A hub driving assembly adapted to be connected to a sprocket of a bicycle to transmit a driving force from the sprocket to rotate a hub, the hub including an inner tubular wall that extends along an axis of an axle in an axial direction, and a toothed member that is disposed in the inner tubular wall, said assembly comprising:

a sprocket-mounting cylinder including a tubular mount which is adapted to be fitted in the inner tubular wall of the hub by virtue of displacement of said tubular mount to an operating position, and which is rotatable about the axis relative to the axle, said tubular mount having an outer cylindrical surface which surrounds the axis, which is adapted to confront the inner tubular wall of the hub in the operating position, and which extends along the axis to terminate at a tubular end surface, and a plurality of retreat bores which are angularly displaced from one another about the axis, each of said retreat bores extending in the axial direction from said tubular end surface, and in a radial direction relative to the axis to define an opening that extends through said outer cylindrical surface, each of said retreat bores having first and second retaining regions opposite to each other in a driving direction about the axis, and a middle region interposed therebetween, said tubular mount further having a plurality of positioning holes which are angularly displaced from one another about the axis and which respectively extend in the axial direction from said tubular end surface;

a plurality of pawls which are disposed respectively in said retreat bores such that in the operating position, said pawls are movable between a driving position, where said pawls extend radially and outwardly of said outer cylindrical surface for engaging the toothed member, and an idle position, where said pawls retreat radially and inwardly of said outer cylindrical surface so as to permit freewheeling of the hub, each of said pawls including a pivotable end which is inserted into said first retaining region and which is pivotable about a pivot axis oriented in the axial direction, and a coupling end which is opposite to said pivotable end and which is movable between the driving and idle positions by means of pivotal movement of said pivotable end;

a plurality of biasing members which are mounted respectively in said retreat bores, and which are disposed to respectively bias said pawls to the driving position, each of said biasing members being made of a steel strip, and including a bending portion which is bent and which is retained in said second retaining region, and first and second end portions which extend respectively from said bending portion and which are spaced apart from each other in a radial direction relative to the axis so as to vest said second end portion with an urging force for biasing said coupling end to the driving position, each of said positioning holes being formed in said second retaining region and being defined by said bending portion; and a barrier member including a ring abutment which surrounds the axis and which confronts said tubular end surface, and a plurality of inserts which respectively extend in the axial direction from said ring abutment and which are angularly displaced from one another about the axis, each of said inserts being configured to be fitted into a respective one of said positioning holes to bring said ring abutment into abutment against said tubular end surface so as to prevent removal of said pawls and said biasing members from said retreat bores.

2. The hub driving assembly of claim 1, wherein said sprocket-mounting cylinder further includes a sprocket-mounting member which extends from said tubular mount along the axis to be adapted to engage the sprocket, and which is adapted to be mounted laterally and outwardly of the hub in the axial direction when said tubular mount is in the operating position.

3. The hub driving assembly of claim 2, wherein said sprocket-mounting member has an externally threaded portion extending around the axis.

4. The hub driving assembly of claim 2, wherein said sprocket-mounting member has a plurality of splines angularly displaced from one another about the axis.

5. The hub driving assembly of claim 2, wherein said sprocket-mounting member is integrally formed with said tubular mount.

6. The hub driving assembly of claim 2, wherein said sprocket-mounting member is in threaded engagement with said tubular mount.

* * * * *